US 11,408,458 B2

(12) United States Patent
Yoshimura et al.

(10) Patent No.: US 11,408,458 B2
(45) Date of Patent: Aug. 9, 2022

(54) GROMMET

(71) Applicant: YAZAKI CORPORATION, Tokyo (JP)

(72) Inventors: Katsuya Yoshimura, Toyota (JP); Ryohei Toyoda, Toyota (JP); Yasunori Hattori, Toyota (JP)

(73) Assignee: YAZAKI CORPORATION, Tokyo (JP)

( * ) Notice: Subject to any disclaimer, the term of this patent is extended or adjusted under 35 U.S.C. 154(b) by 507 days.

(21) Appl. No.: 16/563,796

(22) Filed: Sep. 6, 2019

(65) Prior Publication Data

US 2020/0080583 A1    Mar. 12, 2020

(30) Foreign Application Priority Data

Sep. 10, 2018  (JP) .............................. JP2018-168715

(51) Int. Cl.
| | |
|---|---|
| B60R 16/02 | (2006.01) |
| H02G 3/00 | (2006.01) |
| H02G 3/22 | (2006.01) |
| F16B 21/06 | (2006.01) |
| B62D 27/02 | (2006.01) |

(52) U.S. Cl.
CPC .............. *F16B 21/06* (2013.01); *B62D 27/02* (2013.01); *B60R 16/0222* (2013.01); *H02G 3/00* (2013.01)

(58) Field of Classification Search
CPC .............................. H02G 3/22; B60R 16/0222
See application file for complete search history.

(56) References Cited

U.S. PATENT DOCUMENTS

| | | |
|---|---|---|
| 2002/0036097 A1 | 3/2002 | Okuhara et al. |
| 2002/0036098 A1 | 3/2002 | Okuhara et al. |
| 2011/0067201 A1 | 3/2011 | Okuhara et al. |
| 2011/0079417 A1* | 4/2011 | Okuhara ............. B60R 16/0222 174/152 G |

FOREIGN PATENT DOCUMENTS

| | | |
|---|---|---|
| JP | 2002-171646 A | 6/2002 |
| JP | 2005-6359 A | 1/2005 |
| JP | 2007-276558 A | 10/2007 |
| JP | 2009-17682 A | 1/2009 |
| JP | 2009017682 A * | 1/2009 |
| JP | 2009-296740 A | 12/2009 |

* cited by examiner

*Primary Examiner* — Hoa C Nguyen
*Assistant Examiner* — Amol H Patel
(74) *Attorney, Agent, or Firm* — Kenealy Vaidya LLP (57) ABSTRACT

A grommet mounted to a through hole formed in a vehicle body panel includes an inner cabin side harness insertion portion that projects toward an inner cabin side through which a wire harness penetrate, an outer cabin side harness insertion portion that projects toward an outer cabin side through which the wire harness penetrate, a lip mountain integrated with the inner cabin side harness insertion portion, a panel abutting portion that abuts on a periphery of the through hole on an outer cabin side of the vehicle body panel, a connection portion that connects the lip mountain and the panel abutting portion, a working portion formed across the outer cabin side harness insertion portion and the panel abutting portion, a work pressing portion integrated with the outer cabin side harness insertion portion and the working portion, and a pressing surface portion that is integrated with the work pressing portion and protrudes toward the lip mountain.

3 Claims, 9 Drawing Sheets

GROMMET

CROSS REFERENCE TO RELATED APPLICATIONS

This application claims priority from Japanese Patent Application No. 2018-168715 filed on Sep. 10, 2018, the entire contents of which are incorporated herein by reference.

BACKGROUND OF THE INVENTION

Field of the Invention

The present invention relates to a grommet, and particularly relates to a grommet mounted to a through hole for protecting a wire harness that penetrates the through hole formed in a vehicle body panel.

Description of Related Art

In related art, a grommet is in a watertight manner fitted to a through hole formed in a vehicle panel of a vehicle such as an automobile, and a wire harness penetrate the grommet in a manner of watertight and difficult to move.

The grommet includes an inner cabin side harness insertion portion into which the wire harness is inserted, a substantially truncated cone shaped (so-called bowl-like) inner cabin side cylindrical portion integrated with the inner cabin side harness insertion portion at a small diameter side end, and a panel abutting portion integrally formed at a large diameter side end of the inner cabin side cylindrical portion. The panel abutting portion cannot enter the through hole, and a vehicle body lock recess is formed at a boundary between the inner cabin side cylindrical portion and the panel abutting portion. Therefore, the inner cabin side cylindrical portion is pulled toward an inner cabin side (a direction of the small diameter side end), so that an outer circumference of the inner cabin side cylindrical portion is reduced in diameter while sliding into the through hole, and the vehicle body lock recess is fitted into the through hole. When a force in a direction away from the inner cabin side is applied by pulling an outer cabin side portion toward an outer cabin side after mounting, the vehicle body lock recess may be removed from the through hole since the vehicle body lock recess is stretched an outer diameter is reduced (for example, see Patent Literature 1).

Therefore, a grommet is disclosed in which the panel abutting portion is difficult to be removed from the through hole even if the panel abutting portion is pulled toward the outer cabin side. That is, an annular inner cabin side lip that can enter the through hole and an annular outer cabin side lip that cannot enter the through hole are integrally formed, a fitting portion is formed at a boundary between an outer circumferential edge of the inner cabin side lip and an outer circumferential edge of the outer cabin side lip, and an outer circumference of a cylinder into which the wire harness is inserted and an inner circumference of the inner cabin side lip are connected by a connection portion. At this time, since a position where the connection portion is connected at the inner cabin side lip is between a position where the connection portion is connected at the cylinder and a position of the fitting portion, the connection portion is axially contracted and an outer diameter of the fitting portion is increased when a force is applied to push the cylinder in a fitting portion direction, so that a remarkable effect is obtained that mounting is ensured and stability is enhanced (for example, see Patent Literature 2).

[Patent Literature 1] JP-A-2002-171646
[Patent Literature 2] JP-A-2007-276558

In the grommet disclosed in Patent Literature 1, since the inner cabin side portion is pulled toward the inner cabin side (the direction of the small diameter side end), when the outer cabin side portion is pushed toward the inner cabin side, an outer circumference of the inner cabin side portion tries to be increased in diameter between a position sliding into the through hole and the outer cabin side portion. Therefore, an excessive force is required to push the outer cabin side portion toward the inner cabin side.

An outer diameter of the inner cabin side lip of the grommet disclosed in Patent Literature 2 is small (thin) at a front end, gradually increases (is thickened) toward the fitting portion, and then decreases (is thinned), so that an outer circumference of the inner cabin side lip has a substantially mountain shape cross section. The inner cabin side lip is connected at a position of an inner circumferential side corresponding to a range where the outer diameter gradually decreases toward the fitting portion. For this reason, when the grommet is mounted to the through hole, the grommet first slides into the through hole in a range where the outer diameter of the inner cabin side lip gradually increases toward the fitting portion. In this way, between a sliding position (outer circumference) and a position (inner circumference) where the connection portion is connected, the inner cabin side lip is increased in diameter by receiving an axial compressive force (a compressive force works in a range including the summit and the mountain becomes high). Therefore, an excessive force is required when the grommet is mounted by pulling or pushing the cylinder toward the inner cabin side.

SUMMARY

One or more embodiments provide a grommet that can be easily mounted to a through hole by being pushed toward the inner cabin side.

In an aspect (1), a grommet mounted to a through hole formed in a vehicle body panel includes an inner cabin side harness insertion portion that projects toward an inner cabin side through which a wire harness penetrate, an outer cabin side harness insertion portion that projects toward an outer cabin side through which the wire harness penetrate, a lip mountain integrated with the inner cabin side harness insertion portion, a panel abutting portion that abuts on a periphery of the through hole on an outer cabin side of the vehicle body panel, a connection portion that connects the lip mountain and the panel abutting portion, a working portion formed across the outer cabin side harness insertion portion and the panel abutting portion, a work pressing portion integrated with the outer cabin side harness insertion portion and the working portion, and a pressing surface portion that is integrated with the work pressing portion and protrudes toward the lip mountain. When the work pressing portion is pressed toward an inner cabin side, the pressing surface portion abuts on the lip mountain and the lip mountain is pushed toward the inner cabin side.

In an aspect (2), a plurality of lip mountains are provided, and recesses are radially formed between the lip mountains.

In an aspect (3), the connection portion includes an inclined portion that is gradually reduced in diameter toward the panel abutting portion, a parallel portion connected to the inclined portion, and a convex portion formed in the parallel portion. When the grommet is mounted to the through hole, the inclined portion slides on an inner circumference of the through hole, and in a state of being mounted in the through hole, the convex portion comes into close contact with the inner circumference of the through hole.

Advantageous Effects of Invention

In the grommet according to the invention, when the working portion is pressed toward the inner cabin side, since the pressing surface portion abuts on the lip mountains and pushes the lip mountains toward the inner cabin side, the lip mountains are reduced in diameter by sliding into the through hole while being deformed so as to fall toward the outer cabin side. Therefore, the through hole is easily passed through, and the connection portion is fitted into the through hole. Therefore, grommet that can be easily mounted by being pushed toward the inner cabin side can be obtained.

Since the recesses are radially formed between the lip mountains, the lip mountains are bent so as to open petals while being close to each other in a circumferential direction, which further facilitate the mounting.

Since the convex portion of the connection portion comes into close contact with the inner circumference of the through hole, a waterproof mechanism is provided.

DETAILED DESCRIPTION

Hereinafter, a grommet according to a first embodiment of the invention will be described with reference to the drawings. Since the drawings are for schematic illustration, shape and size of each member, or positional relationship between members is not limited to the illustrated embodiment. In order to avoid complication of the drawings, some of the signs may be omitted.

First Embodiment

Figure 1:
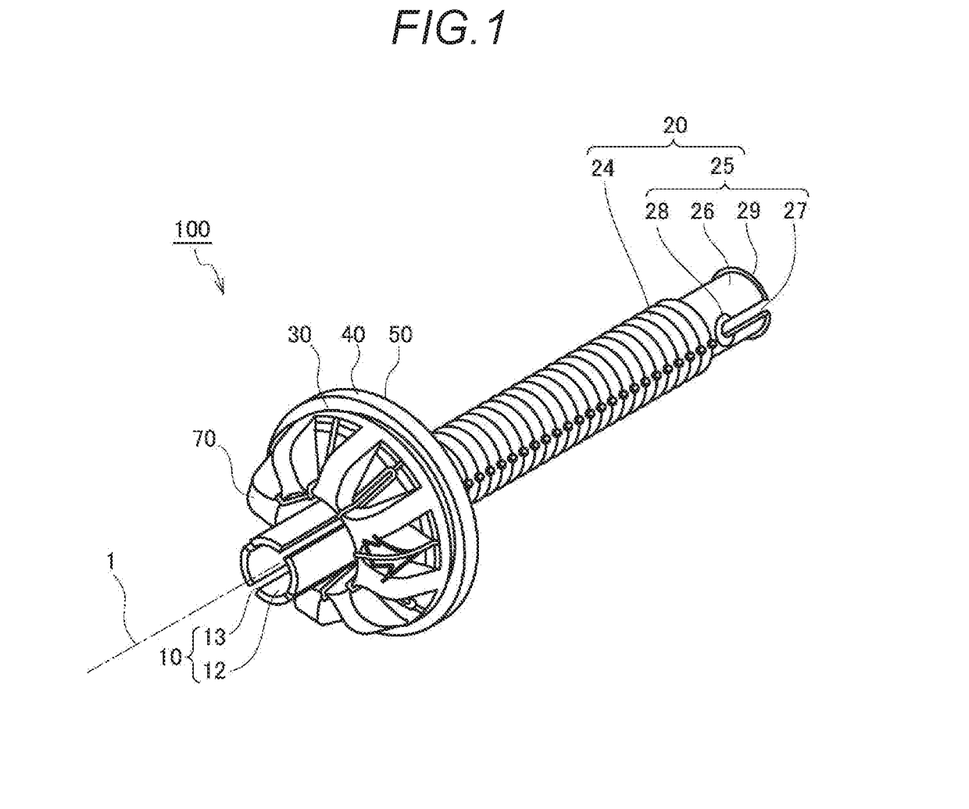
FIG. 1 is a perspective view schematically showing a structure of a grommet according to a first embodiment, as obliquely viewed from an inner cabin side.
Figure 2:
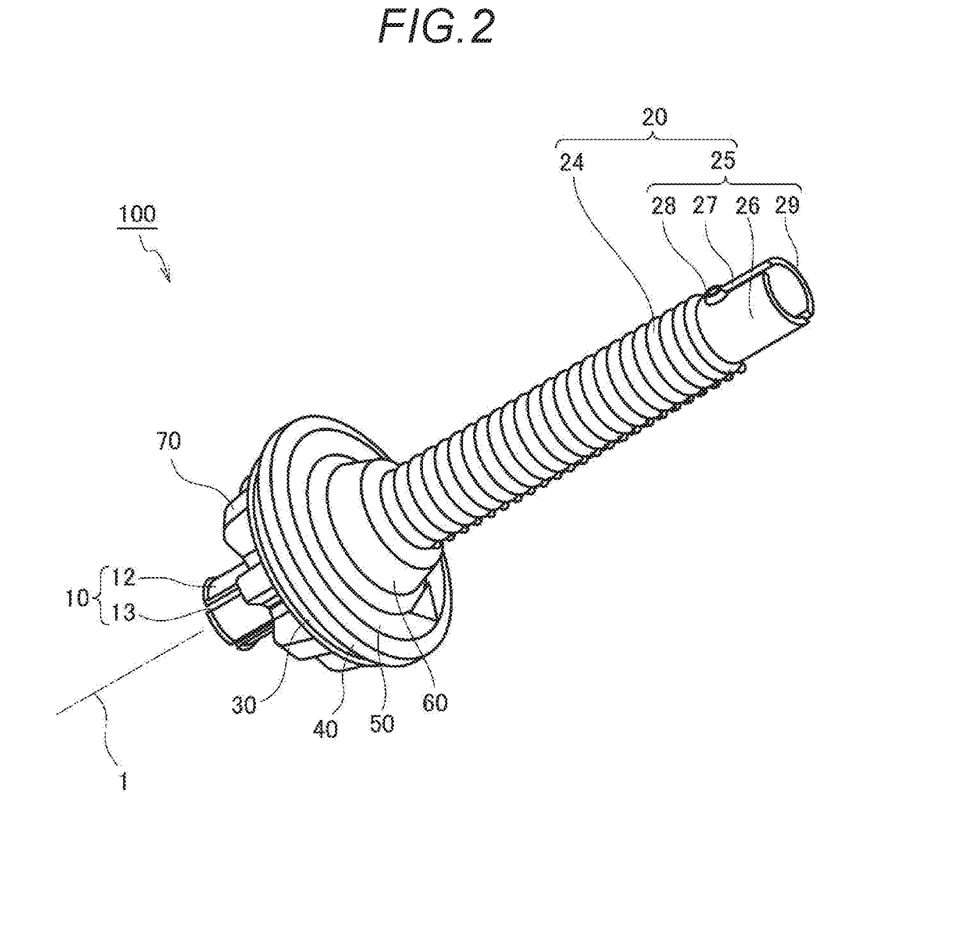
FIG. 2 is a perspective view schematically showing the structure of the grommet according to the first embodiment, as obliquely viewed from an outer cabin side.
Figure 3:
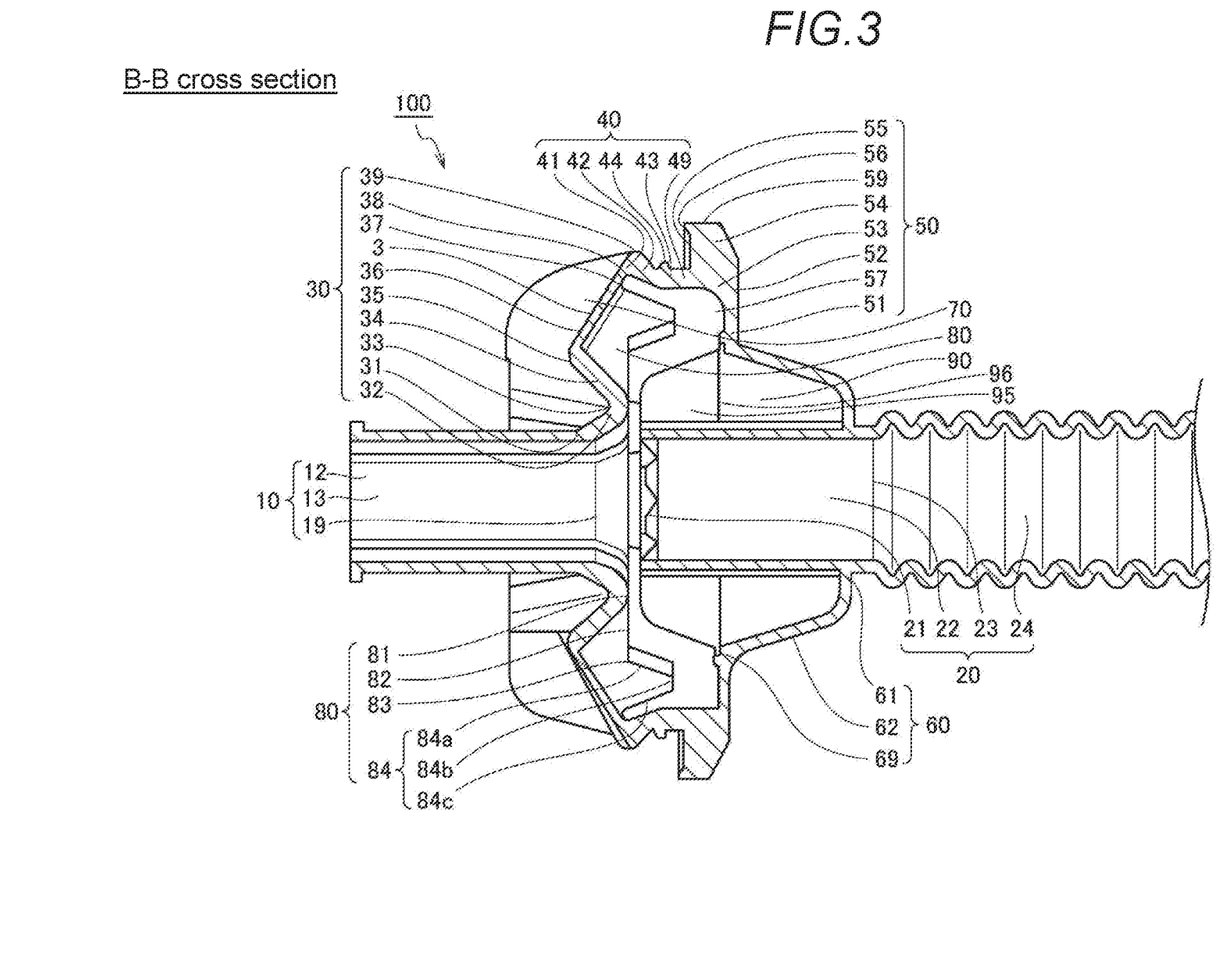
FIG. 3 is a cross-sectional side view (a B-B cross section shown in FIG. 5) schematically showing the structure of the grommet according to the first embodiment.
Figure 4:
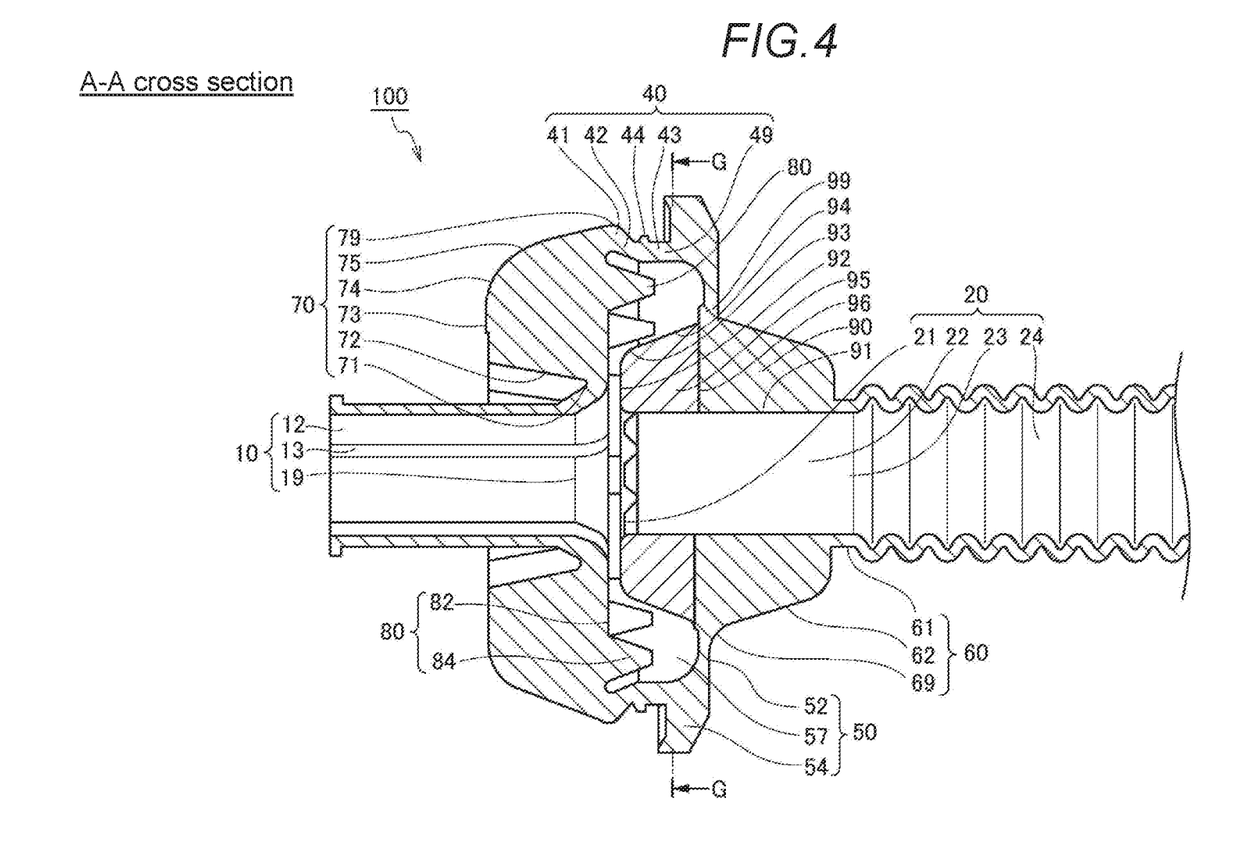
FIG. 4 is a cross-sectional side view (an A-A cross section shown in FIG. 5) schematically showing the structure of the grommet according to the first embodiment.
Figure 5:
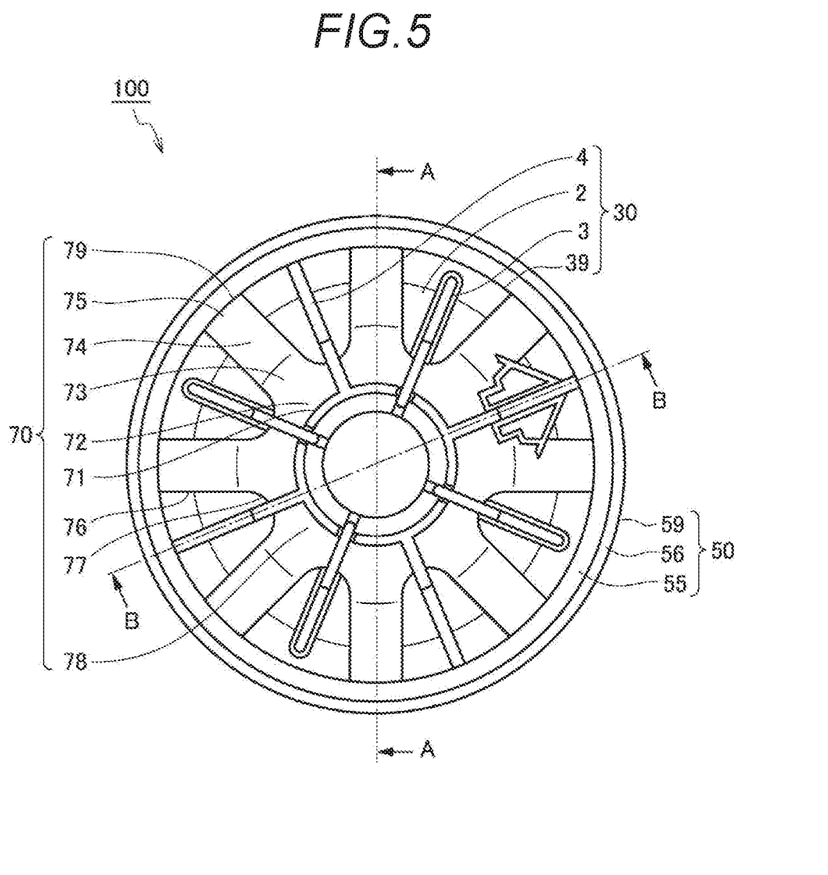
FIG. 5 is a front view schematically showing the structure of the grommet according to the first embodiment.
Figure 6:
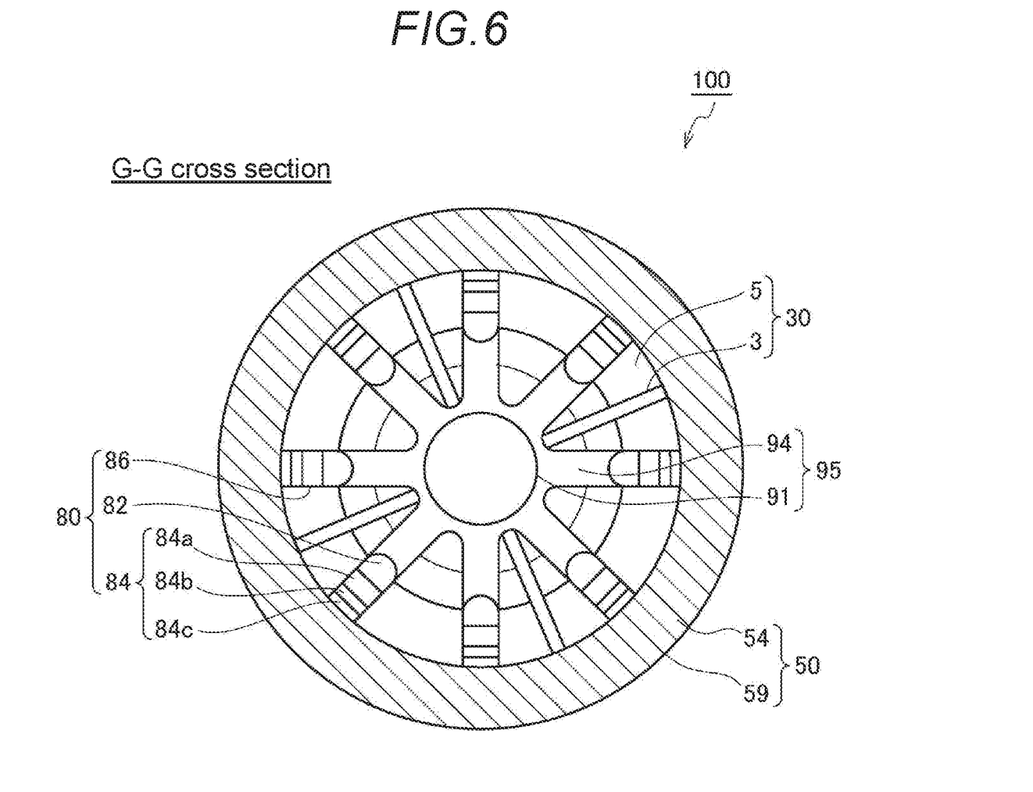
FIG. 6 is a cross-sectional rear view (a G-G cross section shown in FIG. 4) schematically showing the structure of the grommet according to the first embodiment.
Figure 7:
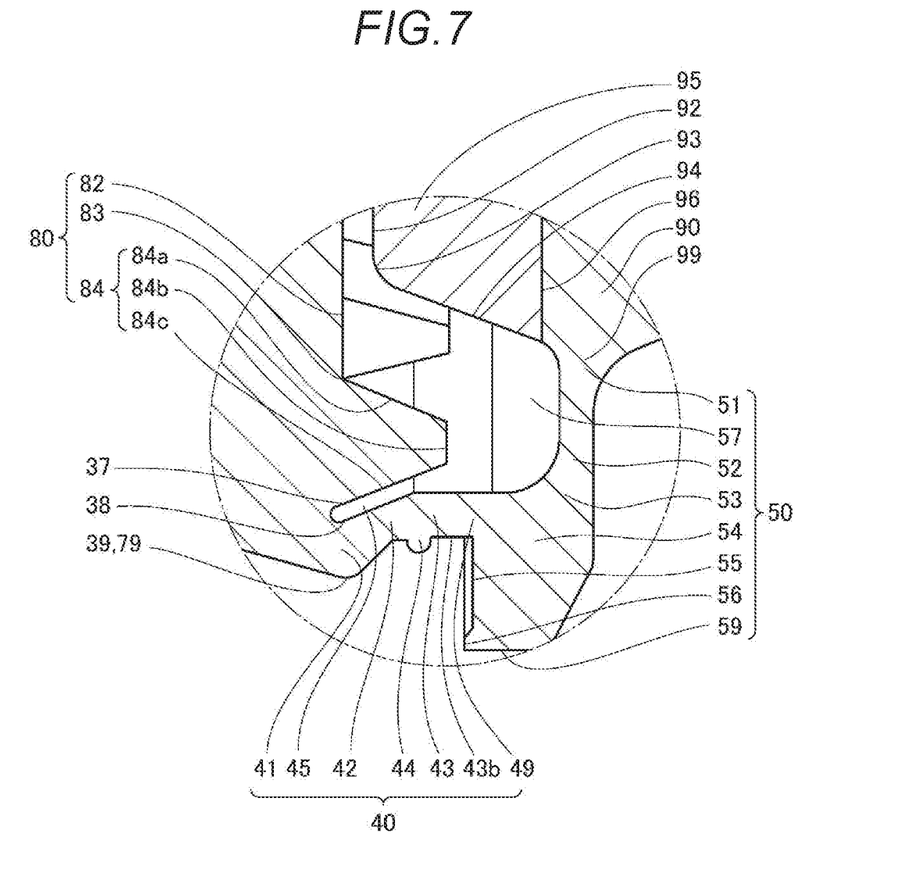
FIG. 7 is a cross-sectional side view schematically showing an enlarged part of the grommet according to the first embodiment.

FIGS. 1 to 7 schematically show a structure of the grommet according to the first embodiment of the invention, in which FIG. 1 is a perspective view as obliquely viewed from an inner cabin side, FIG. 2 is a perspective view as oblique viewed from an outer cabin side, FIG. 3 is a cross-sectional side view (a B-B cross section shown in FIG. 5), FIG. 4 is a cross-sectional side view (an A-A cross section shown in FIG. 5), FIG. 5 is a front view, FIG. 6 is a cross-sectional rear view (a G-G cross section shown in FIG. 4), and FIG. 7 is a cross-sectional side view showing an enlarged part.

(Overall Configuration)

In FIGS. 1 and 2, a grommet 100 is provided for protecting a wire harness (not shown) that penetrates a through hole formed in a vehicle panel of a vehicle such as an automobile. The grommet 100 will be described as being pushed into a through hole 8 from an outer cabin side (vehicle exterior side) toward an inner cabin side (vehicle interior side) (see FIG. 8). The invention is not limited to the through hole 8 formed in a vehicle panel 9, and is also mounted to through holes formed in various structures and various devices.

The grommet 100 includes an inner cabin side harness insertion portion 10 arranged on the inner cabin side and an outer cabin side harness insertion portion 20 arranged on the outer cabin side through which a part of the wire harness penetrates, a lip mountain base 30 integrated with the inner cabin side harness insertion portion 10, and a working portion 60 integrated with the outer cabin side harness insertion portion 20.

Lip mountains 70 are integrally formed on the inner cabin side of the lip mountain base 30, and intermediate ribs 80 are integrally formed on the outer cabin side of the lip mountain base 30.

A work pressing portion 90 is integrally formed on the inner cabin side of the working portion 60, and a disk-shaped panel abutting portion 50 is integrated formed on an outer circumference of the working portion 60. The lip mountain base 30 and the panel abutting portion 50 are connected by a connection portion 40 (see FIGS. 3 and 4).

In addition, "integrally formed" may be referred to a case where separated portions are integrally molded in a continuous state, and a case where separate parts are separately formed and then connected to each other, and hereinafter, may be referred to as "connected" or the like.

(Inner Cabin Side Harness Insertion Portion and Outer Cabin Side Harness Insertion Portion)

In FIGS. 1 and 2, the inner cabin side harness insertion portion 10 is formed of arc pieces 12 having an arc shape in cross section, and axially parallel slits 13 are formed between side edges of the arc pieces 12.

The outer cabin side harness insertion portion 20 includes a slit-free cylindrical portion 22 between a front end 21 and an intermediate position 23, a corrugated portion 24 connected to the cylindrical portion 22, and a slit portion 25 connected to the corrugated portion 24. A pair of through holes 28 is formed in the slit portion 25, and axially parallel slits 27 are formed between the through holes 28 and a rear end 29. That is, arc pieces 26 having a semicircular cross section are formed so as to be sandwiched by the slits 27.

Since a central axis of the inner cabin side harness insertion portion 10 coincides with a central axis of the outer cabin side harness insertion portion 20, which is hereinafter referred to as a "central axis 1", a direction toward or a position near the central axis 1 is referred to as "inward" or "inside", and a direction or a position away from the central axis 1 is referred to as "outward" or "outside". In addition, a side of the inner cabin side harness insertion portion 10 is referred to as an "inner cabin side", and a side of the outer cabin side harness insertion portion 20 is referred to as an "outer cabin side".

(Lip Mountain Base)

In FIG. 3, the lip mountains 70 projecting toward the inner cabin side are integrated with the lip mountain base 30. The lip mountain base 30 has a thin disk shape with a hole, and in a side view includes an inner circumference 31 connected to a rear end 19 of the inner cabin side harness insertion portion 10, an inner receding portion 32 that is located gradually toward the outer cabin side from the inner circumference 31 to the outside, an advancing portion 34 connected to the inner receding portion 32 at a bottom portion 33 and located gradually toward the inner cabin side to the outside, and an outer receding portion 36 connected to the advancing portion 34 at a top portion 35 and located gradually toward the outer cabin side to the outside.

Since the lip mountains 70 are integrated with the lip mountain base 30 on the inner cabin side, substantially triangular thin portions 2, an annular range close to the inner circumference 31, and an outer circumference 39 are visually recognized in a front view, and the intermediate ribs 80 are integrally formed on the outer cabin side (see FIGS. 5 and 6).

(Lip Mountain)

In FIGS. 4 and 5, the lip mountains 70 has a substantially rectangular shape in the front view, projects toward the inner cabin side between the bottom portion 33 and the outer circumference 39 on the inner cabin side of the lip mountain base 30, that is, in a range excluding the inner receding portion 32, and are equiangularly arranged at eight positions in a circumferential direction, thereby mainly enhancing rigidity of the lip mountain base 30. The lip mountains 70 are connected to the bottom portion 33 of the lip mountain base 30 at a lip mountain inner circumference 71 in the side view, and include a lip mountain inner surface 72 that gradually extends outward toward the inner cabin side, and a lip mountain inner cabin side surface 73 that is continuous with the lip mountain inner surface 72 and perpendicular to the central axis 1, and a lip mountain arc surface 74 that connects the lip mountain inner cabin side surface 73 and a lip mountain outer surface 75. The lip mountain outer surface 75 shows a substantially straight line that is gradually increased in diameter (outward) toward the inner cabin side (a connection portion 40). A position of the lip mountain outer surface 75 farthest from the central axis 1 is a lip mountain outer circumference 79 that coincides with the outer circumference 39 of the lip mountain base 30 (accurately in the front view, the outer circumference 39 has a circumferential shape, while the lip mountain outer circumference 79 has a discontinuous arc shape).

(Intermediate Rib)

In FIGS. 3 and 6, in a plan view, the intermediate ribs 80 are equiangularly arranged at eight positions in the circumferential direction between a position corresponding to the bottom portion 33 and a position slightly inside the outer circumference 39 (hereinafter, referred to as an "outer circumference vicinity 37") on the outer cabin side of the lip mountain base 30. At this time, the lip mountains 70 and the intermediate ribs 80 have the same phases in the circumferential direction.

In the side view, the intermediate ribs 80 include an outer cabin side surface 82 formed between an inner circumference 81 at a position corresponding to the bottom portion 33 and an intermediate position 83 at a position substantially corresponding to the top portion 35, and a projection portion 84 that is formed between the intermediate position 83 and the outer circumference vicinity 37 and protrudes toward the outer cabin side. The outer cabin side surface 82 is perpendicular to the central axis 1, and the projection portion 84 has a substantially trapezoidal shape and includes an inner tapered portion 84a extending outward toward the outer cabin side, a vertical portion 84b connected to the inner tapered portion 84a and perpendicular to the central axis 1, and an outer tapered portion 84c connected to the vertical portion 84b and extending outward toward the inner cabin side.

Although an inner cabin side surface 92 of a pressing surface portion 95 is pressed against the outer cabin side surface 82 of the intermediate rib 80, arrangement of the intermediate rib 80 is omitted, and the inner side surface 92 of the pressing surface portion 95 may be pressed against the lip mountains 70 (the same as the lip mountain base 30).

(Recess and Slit)

In FIGS. 5 and 6, since the lip mountains 70 has a rectangular shape in the front view, side surfaces of adjacent lip mountains 70 (hereinafter, referred to as a "lip mountain side surface 76") are closer to each other as the lip mountain inner circumference 71 is approached, and the lip mountain side surfaces 76 are connected by substantially arc-shaped lip mountain side surface corners 77 in the front view. A range inward than the lip mountain side surface corners 77 of the lip mountain inner cabin side surface 73 is connected in an annular shape in the front view (hereinafter, this portion is referred to as a "lip mountain annular surface 78").

Therefore, the substantially triangular thin portions 2 sandwiched between the outer circumference 39, the lip mountain side surfaces 76 and the lip mountain side surface corners 77 are visually recognized in an inner cabin side surface of the lip mountain base 30 in the front view.

Radially penetrating slits 3 and radially bottomed groove-like recesses 4 are formed in a range (a radial range) of the outer receding portion 36 at positions of symmetry lines of the thin portion 2 (positions in the circumferential direction). At this time, since the recesses 4 and the slits 3 are respectively arranged in a cross shape, the recess 4 is formed in the thin portion 2 adjacent to the thin portion 2 where the slit 3 is formed.

At this time, the slits 3 are intended to facilitate bending deformation of the lip mountain base 30. Instead of the penetrating slits 3, the recesses 4 may be formed in all the thin portions 2.

(Recess and Slit)

In FIG. 6, since the intermediate ribs 80 has a rectangular shape in a rear view similarly to the lip mountain 70, side surfaces 86 of the adjacent intermediate ribs 80 are closer to each other as the inner circumference 81 is approached, and a range of the outer cabin side surface 82 close to the central axis 1 is connected in an annular shape (not shown). The substantially triangular thin portions 2 sandwiched between the side surfaces 86 are visually recognized on the outer cabin side of the lip mountain base 30 in a rear view.

Since the intermediate ribs 80 and the work pressing portion 90 have the same phase in the rear view, in FIG. 6, a range close to the inner circumference 81 of the outer cabin side surface 82 is hidden by the pressing surface portion 95, and the outer circumference vicinity 37 and an outer circumference closest vicinity 38 described later are hidden by a thick portion 54 of the panel abutting portion 50.

Among eight thin portions 5, the penetrating slits 3 are visually recognized at positions of symmetry lines of thin portions 5 in the separated thin portions 2. Instead of the penetrating slits 3, when the recesses 4 are formed in all the thin portions 2, bottomed grooves according to the recesses 4 may be formed in the thin portions 5.

(Working Portion)

In FIG. 3, the working portion 60 has a substantially bell shape, an inner circumference 61 is connected to the intermediate position 23 of the outer cabin side harness insertion portion 20, and an outer circumference 69 is integrally connected to an inner circumference 51 of the panel abutting portion 50. A side surface 62 gradually approaches inward toward the outer cabin side.

The outer circumference 69 and the inner circumference 51 are virtual surfaces defined for convenience of description, and positions thereof are not strictly specified (the other joint portions are described such that the virtual surfaces are joined to each other).

(Work Pressing Portion and Pressing Surface Portion)

In FIGS. 4 and 6, the work pressing portion 90 is integrated across an inner circumference of the working portion 60 and the outer cabin side harness insertion portion 20, and a projecting pressing surface portion 95 is integrally formed on the inner cabin side of the work pressing portion 90. Work pressing portions 90 and pressing surface portions 95 are radially equiangularly arranged at the same phases as the lip mountains 70 in the circumferential direction (the same as the intermediate ribs 80) in a plan view.

The work pressing portions 90 include an inner circumference 91 connected to the cylindrical portion 22 of the outer cabin side harness insertion portion 20, and an outer circumference 99 integrated with the outer circumference 69 of the working portion 60 (the outer circumference 99 and the outer circumference 69 are virtual surfaces defined for convenience of description).

The pressing surface portions 95 are integrated with the work pressing portions 90 on the virtual surface 96 in a plane substantially the same as a thin portion 52, project to the inner cabin side of the virtual surface 96, and include an inner cabin side surface 92 perpendicular to the center axis 1 from the front end 21 toward the outside, a linear outer surface 94 that extends outward toward the outer cabin side, and a substantially arc-shaped arc surface 93 connecting the inner cabin side surface 92 and the outer surface 94.

(Panel Abutting Portion)

In FIGS. 3 and 4, the panel abutting portion 50 is integrated with the outer circumference 69 of the working portion 60 in the side view, and includes the thin portion 52 perpendicular to the central axis 1, and a thick portion 54 integrated with the outer circumference of the thin portion 52 (hereinafter, referred to as an "intermediate position 53"). The thick portion 54 is located on the inner cabin side of the thin portion 52 and includes a panel abutment surface 55 perpendicular to the central axis 1. An annular panel abutment projection 56 projecting toward the inner cabin side is formed in an outer circumference 59 of the panel abutment surface 55 (accurately, in a predetermined width range close to the outer circumference 59).

An inside of the thick portion 54 of the panel abutting portion 50 and an inner cabin side surface of the cylindrical portion 22 are smoothly connected to an outside of the outer surface 94 of the work pressing portion 90, and a space portion 57 recessed toward the outer cabin side is formed.

(Connection Portion)

In FIGS. 3, 4 and 7, in the connection portion 40, an inner cabin side surface 41 is connected to the lip mountain base 30 (between the outer circumference closest vicinity 38 and the outer circumference 39), and an outer cabin side surface 49 is connected to the panel abutting portion 50 (in a range close to the intermediate position 53).

The connection portion 40 is a thin-walled cylinder, and includes an inclined portion 42 inclined so as to be gradually inward toward the outer cabin side, and a parallel portion 43 connected to the inclined portion 42 and parallel to the central axis 1. A convex portion 44 is formed on an outer surface of the parallel portion 43 (hereinafter, referred to as a "parallel outer surface 43b").

At this time, an inner surface of the inclined portion 42 is substantially parallel to the outer tapered portion 84c of the projection portion 84, and a gap 45 is formed. That is, the gap 45 is formed between the outer circumference vicinity 37 and the outer circumference closest vicinity 38.

(Mounting Procedure)

Figure 8:
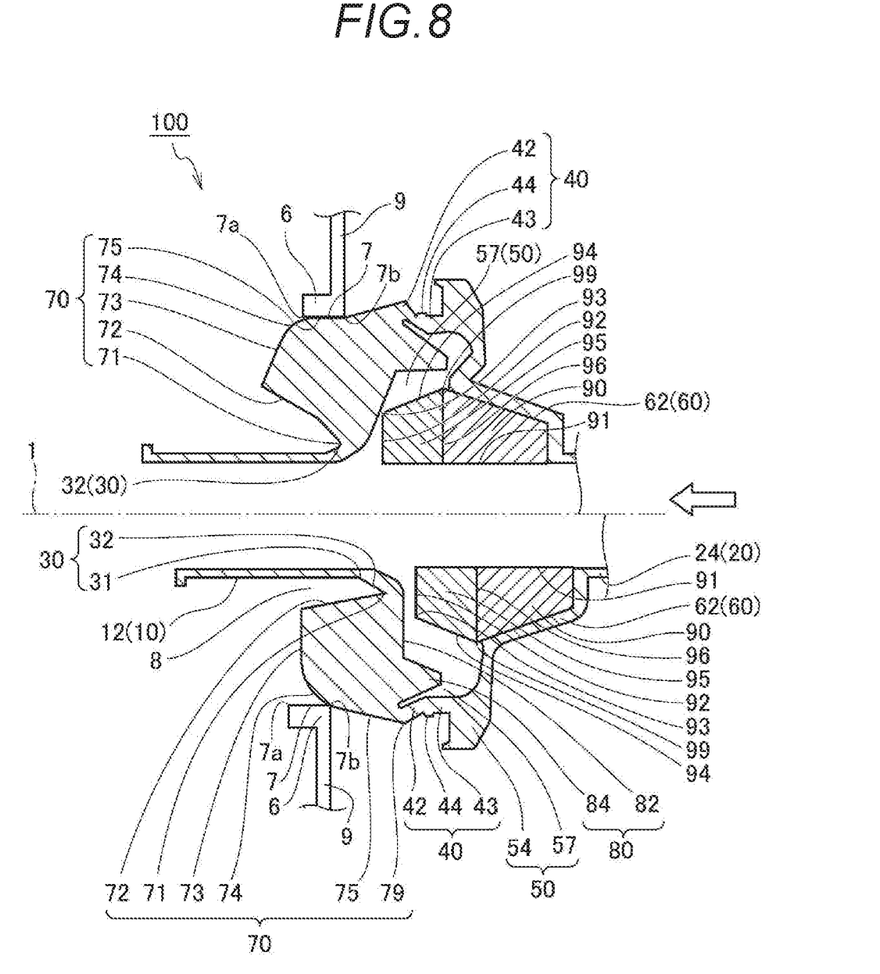
FIG. 8 is a cross-sectional side view schematically showing an operation of grommet mounting procedure according to the first embodiment, in which a lower side of a central axis 1 shows a beginning of mounting, and an upper side of the central axis 1 shows the mounting in progress.
Figure 9:
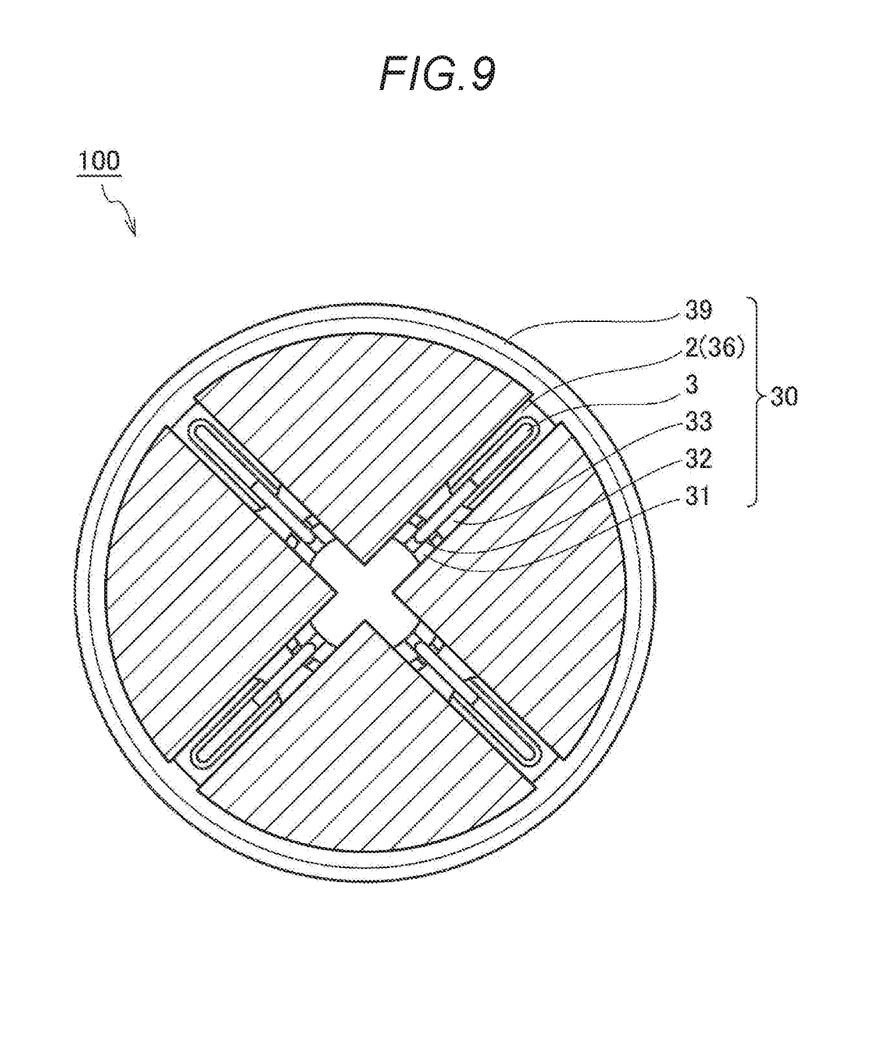
FIG. 9 schematically shows the grommet mounting procedure according to the first embodiment, and is a cross-sectional rear view demonstrating an effect.

FIGS. 8 and 9 schematically illustrate grommet mounting procedure according to the first embodiment of the invention, in which FIG. 8 is a cross-sectional side view showing an operation, and FIG. 9 is a cross-sectional rear view demonstrating an effect. In FIG. 8, a lower side of the central axis 1 shows a beginning of mounting, and an upper side of the central axis 1 shows the mounting in process.

At the beginning of the mounting shown on the lower side of FIG. 8, the lip mountain 70 enters the through hole 8. At this time, the lip mountain arc surface 74 of the lip mountain 70 abuts on an outer cabin side end of a through hole inner circumference 7 of the through hole 8 (hereinafter, referred to as a "through hole rear end 7b") formed in the vehicle panel 9. A flange 6 is provided in the through hole 8, and an inner cabin side end of the flange 6 is referred to as a "through hole tip end 7a" for convenience of description.

During the mounting shown on the upper side of FIG. 8, the lip mountain 70 is pushed into the through hole 8. At this time, the inner cabin side surface 92 (accurately, the arc surface 93) of the pressing surface portion 95 is pressed against the outer cabin side surface 82 of the intermediate rib 80, and is pushed toward the inner cabin side. Therefore, the lip mountain arc surface 74 moves to the inner cabin side while sliding on the through hole inner circumference 7, and the lip mountain outer surface 75 subsequently slides on the through hole inner circumference 7.

In this way, the lip mountain 70 is deformed as if the entire lip mountain is rotated toward the outer cabin side around the lip mountain inner circumference 71, so that the lip mountain outer surface 75 is inclined in a direction parallel to the central axis 1. Therefore, a position of the lip mountain outer circumference 79 of the lip mountain 70 moves inward (is reduced in diameter). At this time, an angle formed by the inner receding portion 32 of the lip mountain base 30 and the advancing portion 34 (the same as the lip mountain inner surface 72) is increased, and the lip mountain inner surface 72 is inclined outward toward the inner cabin side, and the lip mountain inner cabin side surface 73 is inclined toward the outer cabin side to the outside. The outer side surface 82 of the intermediate rib 80 is also inclined toward the outer cabin side to the outside, and the projection portion 84 moves toward the outer cabin side and further enters the space 57.

Therefore, when further pushed, the lip mountain outer circumference 79 (the same as the outer circumference 39 of the lip mountain base 30) is separated from the through hole inner circumference 7, so that the through hole inner circumference 7 is fitted to the connection portion 40, and the convex portion 44 comes into close contact with the through hole inner circumference 7.

(Slit)

In FIG. 9, since the slits 3 arranged in a cross shape are formed in the lip mountain base 30 as described above, the lip mountain base 30 may be divided into four fan-shaped portions (hatched regions) as schematically shown, and may be regarded as being connected in a narrow range excluding the slits 3 of the thin portions 2.

In this way, since the fan-shaped portions are connected in a range having extremely low rigidity, it is possible to easily bend "as if flower petals open" during the mounting. Therefore, deformation in which the lip mountain outer surface 75 is inclined in the direction parallel to the central axis 1 is further facilitated.

(Function and Effects)

As described above, the grommet 100 includes the pressing surface portion 95 and the work pressing portion 90, and when the lip mountain 70 is pushed into the through hole 8, the work pressing portion 90 and the pressing surface portion 95 push the lip mountain 70 to the inner cabin side, so that the lip mountain outer surface 75 is deformed so as to fall inward toward the outer cabin side. That is, since the lip mountain outer surface 75 is deformed so as to be parallel to the central axis 1, the lip mountain outer circumference 79 of the lip mountain 70 (the same as the outer circumference 39 of the lip mountain base 30) is reduced in diameter to facilitate the mounting.

At this time, since the lip mountain base 30 includes the recesses 4 and the slits 3, the lip mountains 70 are bent so as to open the petals while coming close to each other in the circumferential direction, thereby further reducing a force required for the mounting. The connection portion 40 includes the convex portion 44, and during the mounting, the convex portion 44 comes into close contact with the through hole inner circumference 7, thereby exhibiting a waterproof function.

On the other hand, in related art, since there is no portion corresponding to the pressing surface portion 95 and the work pressing portion 90, the working portion 60 is gripped and the panel abutting portion 50 is pushed into the inner cabin side. In this way, the lip mountain base 30 is pushed toward the inner cabin side through the connection portion 40, and the lip mountain outer circumference 79 of the lip mountain 70 slides to the through hole rear end 7b, and is pushed obliquely outward toward the inner cabin side. Therefore, an angle formed by the lip mountain outer surface 75 with the central axis 1 is increased, and the lip mountain outer circumference 79 (the outer circumference 39) is increased in diameter, thereby requiring a large pushing force. Similarly, since the connection portion 40 is also increased in diameter, incomplete fitting may occur.

The invention has been described above based on the first embodiment. It should be understood by those skilled in the art that the first embodiment is an example, and various modifications can be made to the components and combinations thereof, and such modifications are also within the scope of the invention.

INDUSTRIAL APPLICABILITY

As described above, the invention can be widely used as various grommets mounted in through holes formed in vehicle body panels in various structures.

What is claimed is:

1. A grommet mounted to a through hole formed in a vehicle body panel, the grommet comprising:
   an inner cabin side harness insertion portion that projects toward an inner cabin side through which a wire harness penetrate;
   an outer cabin side harness insertion portion that projects toward an outer cabin side through which the wire harness penetrate;
   a lip mountain integrated with the inner cabin side harness insertion portion and having a lip mountain outer surface inclined so that an inner cabin side surface of the lip mountain outer surface is close to a central axis of the through hole rather than an outer cabin side surface of the lip mountain outer surface, the lip mountain outer surface being continuous from the inner cabin side surface to the outer cabin side surface; wherein the lip mountain outer surface slides on an inner circumference of the though hole during the grommet is mounted to the through hole of the vehicle body panel;
   a panel abutting portion that abuts on a periphery of the through hole on the outer cabin side of the vehicle body panel;
   a connection portion that connects the lip mountain and the panel abutting portion;
   a working portion formed across the outer cabin side harness insertion portion and the panel abutting portion;
   a work pressing portion integrated with the outer cabin side harness insertion portion and the working portion; and
   a pressing surface portion that is integrated with the work pressing portion and protrudes toward the lip mountain,
   wherein when the work pressing portion is pressed toward the inner cabin side, the pressing surface portion abuts on the lip mountain and the lip mountain outer surface is moved to be inclined in a direction parallel to the central axis.

2. The grommet according to claim 1, further comprising: more than one of the lip mountain, and
   a plurality of recesses, each of the recesses is radially formed between a respective pair of the lip mountains.

3. The grommet according to claim 1,
   wherein the connection portion includes an inclined portion that is gradually reduced in diameter toward the panel abutting portion, a parallel portion connected to the inclined portion, and a convex portion formed in the parallel portion, and
   wherein when the grommet is mounted to the through hole, the inclined portion slides on an inner circumference of the through hole, and in a state of being mounted in the through hole, the convex portion comes into close contact with the inner circumference of the through hole.

* * * * *